United States Patent [19]
Augris et al.

[11] 3,729,709
[45] Apr. 24, 1973

[54] CONTROL AND IDENTIFICATION DEVICE

[75] Inventors: Rene Augris, Versailles; Jacques Beyer, Saint-Cyr-l'Ecole, both of France

[73] Assignee: Compagnie Industrielle des Telecommunications cit-Alcatel, Paris, France

[22] Filed: June 16, 1971

[21] Appl. No.: 153,682

[30] Foreign Application Priority Data

June 16, 1970 France..................................7022110

[52] U.S. Cl..................340/169, 340/147 T, 340/172
[51] Int. Cl..............................................H04q 9/06
[58] Field of Search......................340/147, 172, 176, 340/169; 179/18 GE, 18 GF

[56] References Cited

UNITED STATES PATENTS

| | | | |
|---|---|---|---|
| 3,484,559 | 12/1969 | Rigby | 340/172 X |
| 3,466,606 | 9/1969 | Henquet et al. | 340/172 X |
| 3,261,919 | 7/1966 | Aaron et al. | 340/172 X |
| 3,588,828 | 6/1971 | Schulein | 340/172 X |
| 3,317,895 | 5/1967 | Cavin et al. | 340/169 |

*Primary Examiner*—Donald J. Yusko
*Attorney*—Richard C. Sughrue et al.

[57] ABSTRACT

A control member and identification device, especially for telecommunications exchanges, involves two associated power sources and control circuits, arranged in a parallel manner, successively or simultaneously sending, over a common circuit, different control currents so as to act selectively upon the members.

11 Claims, 5 Drawing Figures

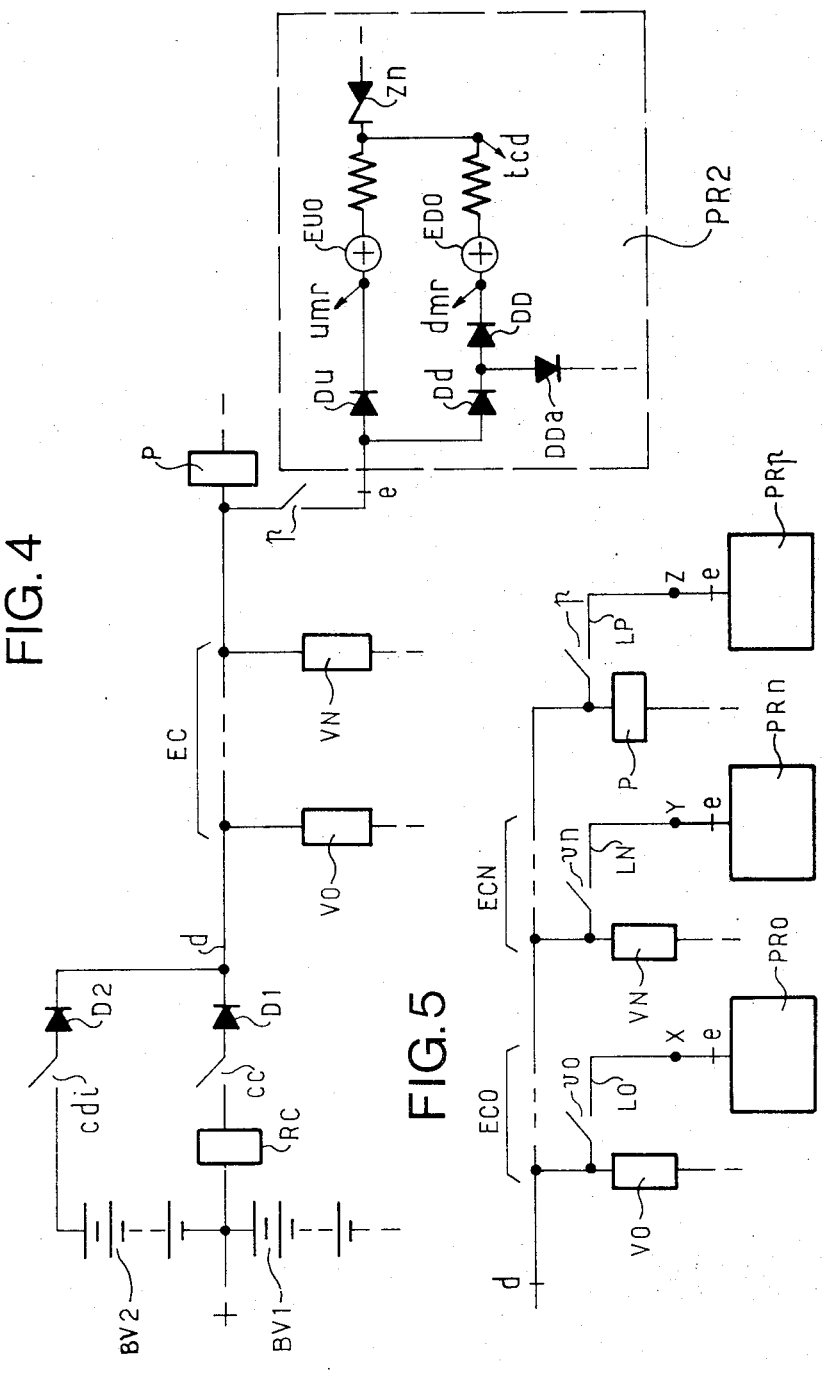

3,729,709

CONTROL AND IDENTIFICATION DEVICE

BACKGROUND OF THE INVENTION

This invention relates to a device for the control and identification of members that can be used especially in telecommunications exchanges.

Identification devices used to identify members and which use special wires for the identification function are known. In such devices, each of the wires is assigned to a different member, and a potential, applied to this wire by the member being called makes it possible to identify this member by appropriate detection means.

SUMMARY OF THE INVENTION

The control and identification device according to the invention differs from earlier devices in that the wire used for identification is not specialized for that function but also assumes other functions. For example, the identification wire can also be used for the connection and maintenance of a selection chain consisting of one or more stages and the control of the various stages connected to the wire.

The invention concerns a device for the control and identification of members controlled by a principal circuit, especially in telecommunications exchanges, characterized by the fact that it involves a supplementary circuit which makes it possible, successively or simultaneously, to send out, over a common circuit, at least two separate commands for different functions, including a control and an identification command. Each circuit, both principal and supplementary, is supplied by a power source and includes a control member. The common circuit is brought up to the voltage of one of the sources or to the sum of the voltages of the two sources.

According to one feature of the invention, the device is equipped with two series-connected power sources, the point that is common to the two sources determining one end of a first circuit involving three successive portions. The first portion of the first circuit includes at least one control member, a switch, and a diode. The second portion consists of a conductor permitting the connection and maintenance of the members of one chain. The third portion involves at least one diode and a detection member. A second circuit comprises one of the sources and at least one switch and one diode. It is mounted in a parallel fashion on the third portion of the first circuit.

According to another feature of the invention, the device is made up of two portions, one of them, a transmitting portion, presents an identification command, the other one, a receiving portion, detects this command. These two parts are connected, at the moment of identification, by the second portion of the first circuit, termed the "chain wire." In a known manner, the chain wire permits the connection of one or more members by successive connections established by means of one of the power sources, through the switching stages of the chain.

According to another feature of the invention, the transmitting portion consists of two associated batteries, a first one supplying power to the first two portions of the first circuit, and represented here by a general power supply battery. The second battery supplies the second circuit and the last two portions of the first circuit. This battery is the identification battery. The first battery has its positive pole connected to the negative pole of the second one and the point that is common to these two poles is grounded and also connected to the end of the third portion of the first circuit. The potential from the identification battery is applied to the chain wire which is subsequently used for the application of the connection potential coming from the general supply battery.

According to another feature of the invention, the diode, inserted in the first portion of the first circuit, and the diode inserted in the second circuit, have their cathodes connected, at a common point, to the chain wire. The identification potential, applied to the chain wire by the switch of the second circuit, is added to the connection potential coming from the blocking diode inserted in the first portion of the first circuit, said potential thus guaranteeing maintenance of the chain members during the identification operation.

According to another feature of the invention, the switch of the second circuit, which makes it possible to present the identification command, can be closed either by means of an electromechanical relay contact or by means of a transistor switching system or by any other means. The first method requires the insertion of the contact between the positive pole of the identification battery and the anode of the diode of the second circuit. The second method is implemented through the introduction of a transistor into the second circuit which then involves a supplementary diode whose cathode is connected to the emitter of the transistor and whose anode is connected to the positive pole of the identification battery, the transistor collector being connected to the anode of the initial diode. A first resistance grounds the emitter of the transistor, while a second resistance connects the base of the transistor to the positive pole of the identification battery, said base being also connected to an identification control wire. The switch of the first circuit is capable of being constituted in a similar manner by electronic means.

According to another feature of the invention, the control member in the first portion of the first circuit runs through several successive states, that is:

An initial resting state, when the connection and maintenance command has not yet been carried out (switches of first and second circuits open);

A second, temporary working state, where the connection command has been carried out (switch of first circuit closed) but where the identification command has not yet taken place (switch of second circuit open);

A third temporary resting state during identification, with the switches of the first and second circuits being closed;

A fourth temporary working state, similar to the second state, but capable of being differentiated in terms of time, this state being obtained when the identification has been completed;

Return to the initial resting state, after the chain has been released (switches of first and second circuits are open).

According to another feature of the invention, the receiving part, constituting the third portion of the first circuit, can be comprised of a magnetostatic relay control windings, one end of which is connected to ground potential through a resistance and the other end being connected to one output of the diode matrix with one input and several outputs, the matrix permits coding of the member engaged at the end of the second portion of the first circuit, forming the input to the matrix. This manner of detecting the identification potential, by means of magnetostatic relays with low-impedance windings polarized to the ground requires a low-voltage identification battery.

According to another feature of the invention, the control command windings of the magnetostatic relays may be polarized to the negative potential of the general supply battery. This arrangement, in the transmitting part, requiring a voltage identification battery similar to that of the supply battery and, in the receiving portion, the introduction of a breakdown diode common to the control winding circuits of the magnetostatic relays, the negative polarity of the supply battery being connected to the anode of the breakdown diode whose cathode is connected to the common ends of resistances opposing the windings.

According to another feature of the invention, each magnetostatic relay control winding, which detects the identification potential, may be replaced by an electromechanical relay, by a transistor, or by any other detection element.

According to yet another feature of the invention, the transistors used as detection elements have their emitters and the base grounded through a respective resistance, the emitter of the transistor being connected to the matrix circuit, the collector being connected to the utilization circuit.

According to still another feature of the invention, the receiving part of the device may be connected to the outputs of any switching stage of the chain and may thus permit the simultaneous identification of members connected to the stage, each connected member being linked to the input of the matrix of the receiving part.

BRIEF DESCRIPTION OF THE DRAWINGS

The features and advantages of the invention will emerge from the following description of ways of implementing the invention, given here by way of non-restrictive example, with reference to the attached drawing where:

FIG. 4 represents a variation of the device according to the invention, the identification potential here being given by means of a battery similar to the general supply battery, the detection of this potential, by magnetostatic relays, being subject to the introduction of a breakdown diode common to the detection circuits;

FIG. 5 shows the use of the receiving part of the device for the identification of members situated at different stages of a switching chain, these members being capable of being, for example, relays of a selection stage.

DETAILED DESCRIPTION OF THE PREFERRED EMBODIMENTS

One of the methods currently used to establish a connection through successive switching stages is to design — on the basis of information (subscriber number, for example) collected by a central member (recorder, for example), the coordinates of connection points in the various stages, a terminal member having been selected among several members to give the order to the central member to perform the connection, the latter then presenting a potential on a chain wire which makes it possible — by successive connections of elements (relays, for example) of switching stages — to establish, through these stages, connections between the central member and the terminal member, the chain wire thus — by virtue of the successive establishment of connection points — leading all the way up to the terminal member whose engagement it performs. After the connection has thus been established, at least one element of each switching stage (relay, for example) and of the terminal member (pickup relay, for example) is connected in parallel to the chain wire and is kept excited by the potential presented upon this wire by the central member.

Figure 1:
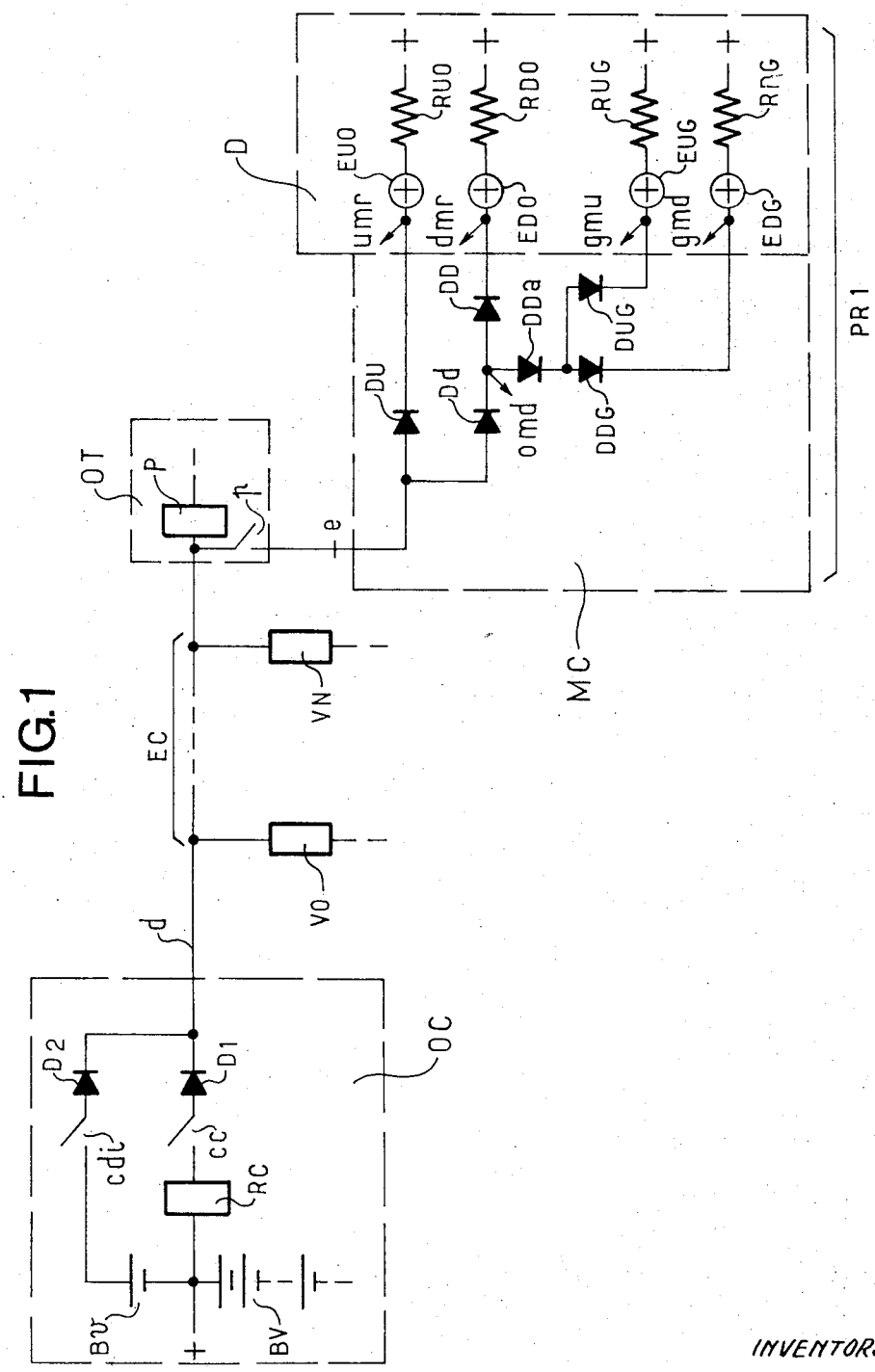
FIG. 1 schematically represents a device providing for the connection and maintenance of members as well as the coding of the number of a member by a diode matrix as well as the circuits and members of the device according to the invention permitting the identification of connected members and the control of connection and identification commands.

The diagram in FIG. 1 shows the connection represented by a chain wire $d$, established between a central member OC and a terminal member OT, relays such as VO, VN of the switching stages EC and a pickup relay P of the terminal member having been connected by the connection potential, coming from a general battery BV. This potential, due to ground polarity (+ polarity), connected to the positive pole of this battery, being presented on wire $d$ by a switch $cc$, which is a contact of a connection command relay. This relay is not shown in the drawing.

The chain wire $d$ is extended either directly, or through a contact $p$ of the pickup relay of the terminal member, to the input $e$ of a coding matrix MC. This diode matrix permits the channeling of the input circuit into several circuits according to the desired code. The matrix represented in FIG. 1 provides coding in terms of units of the decimal system. Certain circuits, multiplied by chain members, perform a similar function here. The circuit of diode DU provides for the coding of a member, the circuit of diodes D$d$ and DD provides for the coding of a group of 10 members, the circuits of diodes DD$a$ and DUG provides for the coding of groups of members and the circuit of diodes DD$a$ and DDG provides for the coding of 10-unit member groups, a duplication omd being performed on all detection circuits and duplications being performed, such as $umr$ on the members of the same unit, dmr on the members of the same cluster of 10, gmu and $gmd$, respectively, on the groups of members of the same unit and the same 10-cluster.

FIG. 1 represents the circuits and elements according to the invention, added in the central member OC to permit the transmission and control of identification information and, in one preferred version of a detection system D, permitting the detection of this information, the entire assembly constituting the control and identification device according to the invention. In the first portion of the first circuit of the central member, which controls the connection, there is provided a control relay RC and a diode D1, the relay having one of its terminals connected to the positive polarity and the other terminal to the switch cc, the diode D1 having its anode connected to this switch. A connection, comprising, in series, a low-voltage battery Bv, an identification command switch cdi and a diode D2, is connected in parallel to the preceding circuit portion, the negative pole of battery Bv being connected to the point common the ground polarity and to the positive pole of the battery BV, the positive pole of battery Bv being connected to the switch cdi and the cathode of the diode D2 being connected to the cathode of diode D1. This connection constitutes the identification control circuit.

The detection system D comprises the command windings EUO, EDO, EIG, and EDG of magnetostatic relays permitting, respectively, the identification of a member of the 10-cluster member, of the group and of the 10-cluster of groups. Each of these windings has an end which is connected to ground potential through a respective resistance RUO, RDO, RUG, and RDG, with its opposite end connected to the coding circuit of the matrix, this end of the winding EUO being also connected to the circuits of the matrices permitting the coding of member having the same rank (umr), the one of the winding EDO being also connected to the coding circuits of the tens of members having the same rank (dmr), one of the winding EUG being connected to the coding circuits of groups of members having the same rank (gmu) and the one of winding EDG being connected to the coding circuits of groups of members of the same 10-cluster (gmd).

The entire control and identification device described above may be broken down into two principal circuits, the first circuit comprising three different portions. The first portion which is the connection and holding commmand circuit is situated in the central member. The second portion is the chain wire linking the central member to the terminal member. The third portion is the coding matrix and the detection system. The second circuit is the identification and holding command circuit situated in the central member.

The device according to the invention operates in the following manner. During the establishment of the connection command (switch cc closed), the central member OC brings the chain wire d to a potential close to ground potential designated with + polarity. The current which is established in the first two portions of the first circuit causes activation of the low-impedance control relay RC, of relays VO, VN of switching stages EC and of pickup relay P of the terminal member OT. Placing the control relay RC in an activated state signifies that the connection command has been carried out.

The ground potential presented on the wire d by the connection command is provided at the input e of matrix MC, either directly, or through the working contact p of the engaged pickup relay. All of the windings EUO, EDO, EUG, and EDG of the magnetostatic relays have their second ends at the same ground potential and therefore are not excited.

The central member OC then establishes an identification command by closing the switch cdi. The positive, low-voltage potential v of battery Bv is then applied, through diode D2, to wire d and consequently to the input e of the matrix. This causes a current to flow through the second circuit (battery Bv, switch cdi, diode D2), as well as the last two portions of the first circuit (chain wire and matrix-detector assembly). The chain wire d sees the identification potential v and the first portion of the first circuit is no longer traversed by a current and the relay RC is released. This occurs since the potential v is positive with respect to ground causing the diode D1, whose anode is at a potential near ground potential and whose cathode is essentially at a potential v, to become back biased. This presents the short-circuit of battery Bv. This second resting state on relay RC enables us to control the moment of identification.

The two ends of the windings belonging, respectively, to the electromagnets of the relays VO and VN and to the relay P, are brought to a potential difference (V +v) and causing the relays to be continually energized. This voltage, which is only a few volts greater than the potential V of the general supply battery BV, offers the advantage of being very much lower than the critical voltage supported by the varistances connected to the terminals of the windings of the electromagnets of the relays. Thus, the device of the invention does not require any modification — in existing equipment — of said varistances which are frequently used as means of protection against overvoltages. Diodes D1 and D2, respectively, prevent the effects of any possible overvoltages on the first portion of the first circuit and on the second circuit.

The potential v on wire d is provided either directly, or through contact P to the input e, and a current is established through the matrix causing the control windings of the magnetostatic relays to be excited, bringing about the engagement of corresponding relays which are not shown in the figure. The operation of the magnetostatic relay is developed in U.S. Pat. No. 2,946,896, 26 July 1960. The excitation of winding EUO has thus made it possible to identify the engaged member, the excitation of winding EDO has made it possible to identify the 10-cluster to which this member belongs, the excitation of the winding EUG has made it possible to identify the group of members in which is located the connected member, and the excitation of winding EDG has made it possible to identify the 10-cluster of groups of members.

The diodes Du, Dd, DD, DDa, DUG, DDG, make it possible to prevent current flow in the chain wire as a result of the ground potential connected to the resistances assigned to the command windings of the relays and also to prevent false identifications.

Figure 2:
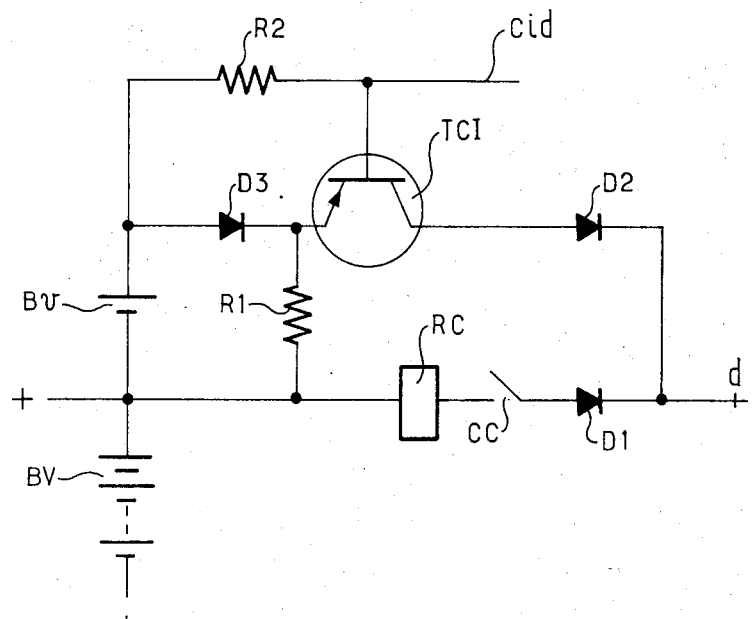
FIG. 2 shows one way of presenting the identification potential by electronic means.

One way of placing the low-voltage battery patented on the chain wire by a means other than a relay contact is obtained by the transistor switching device shown in FIG. 2. In this device, the batteries BV and Bv, the control relay RC, the switch CC, the diodes D1 and D2, are arranged in a manner similar to that illustrated in FIG. 1. A transistor TCI has its collector linked to the anode of the diode D2, its emitter being connected at a point common to the cathode of diode D3 and an end of a resistance R1 whose opposite end is connected to ground. The anode of diode D3 is connected at a common point to the positive pole of battery Bv and to an end of a resistance R2 whose opposite end is connected to the base of the transistor and to an identification command wire cid.

Since no potential is present on wire cid, the transistor TCI is off, its emitter and base being essentially at the potential of the positive pole of battery Bv. When wire cid is supplied with a potential smaller than that of the positive pole of battery Bv, the transistor TCI becomes conducting and the positive potential v of the battery Bv appears on wire d. The diode D3 permits the fixation of the emitter potential to obtain the correct cut-off of the transistor.

Figure 3:
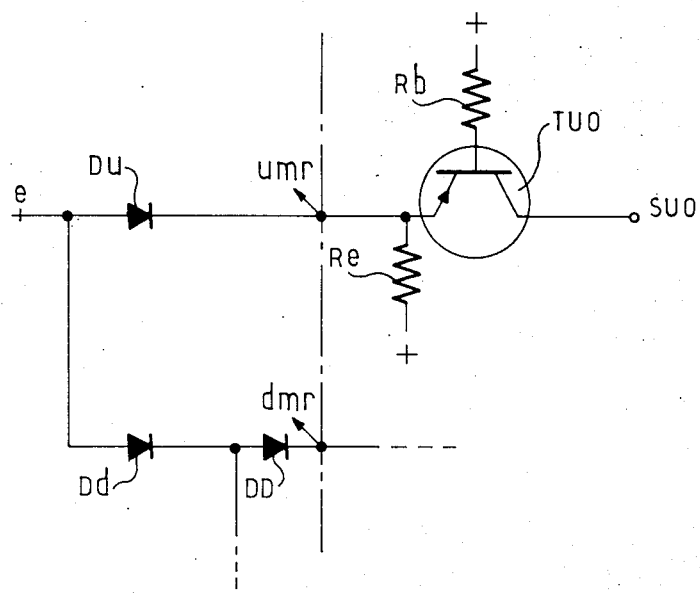
FIG. 3 represents a device for the detection of the identification potential by means of transistors.

FIG. 3 shows one way of detecting — by means of transistors — the identification potential presented on the input wire of the matrix, said transistors playing the role of the windings of magnetostatic relays. Each winding of the detector device D of FIG. 1 is replaced by a transistor of the pnp type, the winding EUO being replaced by a transistor TUO, the winding EDO being replaced by a transistor TDO, etc. The emitter and base of these transistors are, respectively, grounded through resistances Re and Rb, while the collector of transistor TUO is connected to the output point SUO, the collector of transistor TDO is connected to the output point SDO, etc. When no potential is presented on wire d, these transistors are off, and their emitter-base junction is at ground potential. When a positive identification potential v is presented on an input wire e, the transistors, corresponding to the identification of this wire, turn on their emitters, which are marked with the identification potential, become positive with respect to the ground potential at the bases of these transistors.

One variation of the identification device is shown in FIG. 4. The low-voltage battery Bv of the device in FIG. 1 is replaced by a battery BV2 with voltage V2, similar to the potential V1 of the general supply battery BV1. The receiving part PR2, comprising the coding and detection circuits, is unchanged, except for the fact that the windings of the magnetostatic relays are polarized by the negative pole of the general supply battery, and except for the fact that a breakdown diode Zn is inserted in a circuit common to the windings, the anode of the diode being connected to the negative pole of the supply battery and the cathode being connected to the common ends of resistances opposite to the windings, a multiplying (tcd) being accomplished on all of the detection circuits.

Although the positive potential V2 may be applied to the wire d, by the identification command and although it may be provided on the wire e, the potential difference at the terminals of each magnetostatic relay winding is brought back to a positive voltage v, similar to the one of the identification battery Bv of the device in FIG. 1, due to the voltage drop produced through the breakdown diode Zn. Detection of this potential is accomplished as before.

Another variation consists in replacing the windings of the magnetostatic relays by windings of electromagnetic relays or by any other detection means.

FIG. 5 is a schematic representation of the extention of the chain wire through the connected relays, a connection LO being established by the connection of a relay VO of a first switching stage ECO, a connection LN being established by the relay VN of an nth switching stage ECN, the chain wire thus leading to the pickup relay P of the terminal member of the chain.

The points X, Y, and Z are taken either at the input to the relays or through working contacts vo, vn and p, belonging, respectively, to the relays VO, VN, and to the pickup relay P of the members to be identified. Consequently, depending upon whether the receiving parts PRo, PRn, PRp, have their input e connected to the points X, Y, and Z, we perform the identification of the connection LO, LN, and LP of the switching group, belonging to the connected members, each receiving portion PRO, PRn, PRp, being capable of being made up of assemblies PR1 or PR2.

Of course, the invention is by no means confined to the ways of implementation described and shown here. These are given only by way of example. Without going beyond the framework of the invention, we can make changes as to detail, we can change certain arrangements, or we can replace certain means with equivalent means. In particular, the transmitting parts, generally situated in the central member, may be situated in any other member suited for the needs visualized here. The identified command could also be triggered remotely for test communications, for example. Moreover, the identification potential may also be presented and detected at any moment during the establishment of a switching chain.

The invention could also be applied to switching assemblies whose supply battery would have the negative pole grounded, instead of the positive pole. It would then suffice to reverse the identification battery, the latter's positive pole being grounded and being connected also to the negative pole of the supply battery. The orientation of the diodes would then be inverted, both in the part presenting the identification command, and in the part permitting the reception of this command in the detector, with connected members being supplied by the positive pole of the battery.

What is claimed is:

1. A device for controlling and identifying members in a telecommunications exchange comprising:
   a. a control and identification circuit means for selectively issuing a DC control signal and a DC identification signal, and
   b. a common wire coupled to said control and identification circuit means for carrying said control and identification signals, and
   c. said control and identification circuit including first and second DC potential sources for generating said control and identification signals, said control signal appearing on said common wire as the voltage across one of said sources, said identification signal appearing on said common wire as the sum of the voltages of the two sources.

2. The device of claim 1 further including receiving circuit means for detecting identification signals.

3. The device of claim 2, wherein said first and second sources are serially connected at an interconnecting point, said control and identification circuit means further including a first circuit one end of which is coupled to said interconnecting point and comprising at least one control member, a switch and a diode, and a second circuit connected between the free end of one of said potential sources and the other end of said first circuit and comprising at least one switch means and one diode.

4. The device of claim 3, wherein said receiving means comprises a diode matrix and a detection circuit.

5. The device of claim 4, wherein said first and second potential sources comprise an identification battery and a general supply battery, the negative terminal of said identification battery being coupled to the positive terminal of said general supply battery at said interconnection point, said interconnection point being further coupled to ground potential, said control member of said first circuit comprising a relay.

6. The device of claim 5, further including a plurality of switching stages and a terminal member connected to said common wire, said diode matrix being coupled to said terminal member.

7. The device of claim 6, further including a diode matrix and a detection circuit coupled to each of said switching stages.

8. The device of claim 6, wherein said second circuit switch means comprises a transistor, and a second diode, the base and emitter of said transistor being coupled to said identification battery, the collector of said transistor being connected to said common circuit.

9. The device of claim 6, wherein said detection circuit comprises a plurality of magnetostatic relays coupled to said diode matrix and to ground potential.

10. The device of claim 6, wherein said detection circuit comprises a plurality of transistors, the emitter of each of the transistors being connected to said diode matrix and ground potential, the collector to utilization circuitry, the base of said transistors to ground potential.

11. The device of claim 5, wherein said identification and general supply batteries provide a substantially equal potential, said detection circuit including a plurality of detector elements coupled to said diode matrix and a breakdown diode coupled between said detector elements and the negative terminal of said general supply battery.

* * * * *